United States Patent
Arumugasaamy

(10) Patent No.: US 6,382,803 B1
(45) Date of Patent: May 7, 2002

(54) FACETED REFLECTOR ASSEMBLY

(75) Inventor: Panchadsaram Arumugasaamy, Granville, OH (US)

(73) Assignee: NSI Enterprises, Inc., Newark, OH (US)

(*) Notice: Subject to any disclaimer, the term of this patent is extended or adjusted under 35 U.S.C. 154(b) by 0 days.

(21) Appl. No.: 09/563,192

(22) Filed: May 2, 2000

(51) Int. Cl.⁷ .................................................. G02B 5/08
(52) U.S. Cl. ........................ 359/850; 359/851; 359/852; 359/853; 359/858
(58) Field of Search ................................. 359/850, 851, 359/852, 853, 858, 861, 866; 362/345, 346, 347, 360, 364, 320, 297, 341

(56) References Cited

U.S. PATENT DOCUMENTS

| 4,261,030 A | * | 4/1981 | Hernandez ................... 362/263 |
| 5,287,259 A | * | 2/1994 | Lautzenheiser ............. 362/341 |
| 5,493,483 A | * | 2/1996 | Lake ........................... 362/346 |
| 6,132,065 A | * | 10/2000 | Wedell et al. ............... 362/267 |
| 6,152,579 A | * | 11/2000 | Reed et al. .................. 362/320 |

* cited by examiner

*Primary Examiner*—Mohammad Sikder

(57) ABSTRACT

A faceted reflector assembly including a plurality of reflector segments which are preferably, but not necessarily, comprised of pre-anodized and enhanced aluminum having a specular, semi-specular or a diffuse finish. The reflector segments include interlocking means such as tabs and slots for attachment to other reflector segments. The reflector segments, when interlocked, form the faceted reflector of the present invention.

11 Claims, 17 Drawing Sheets

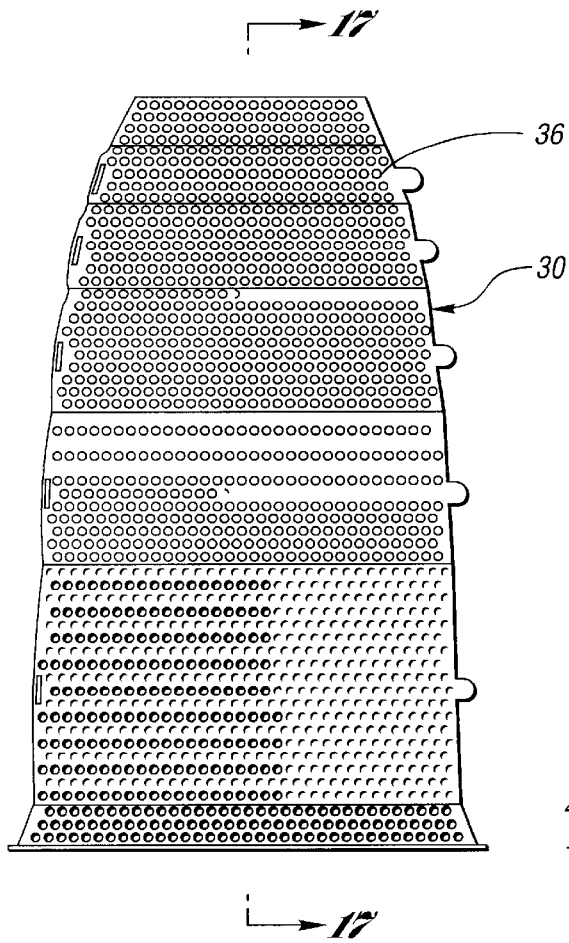
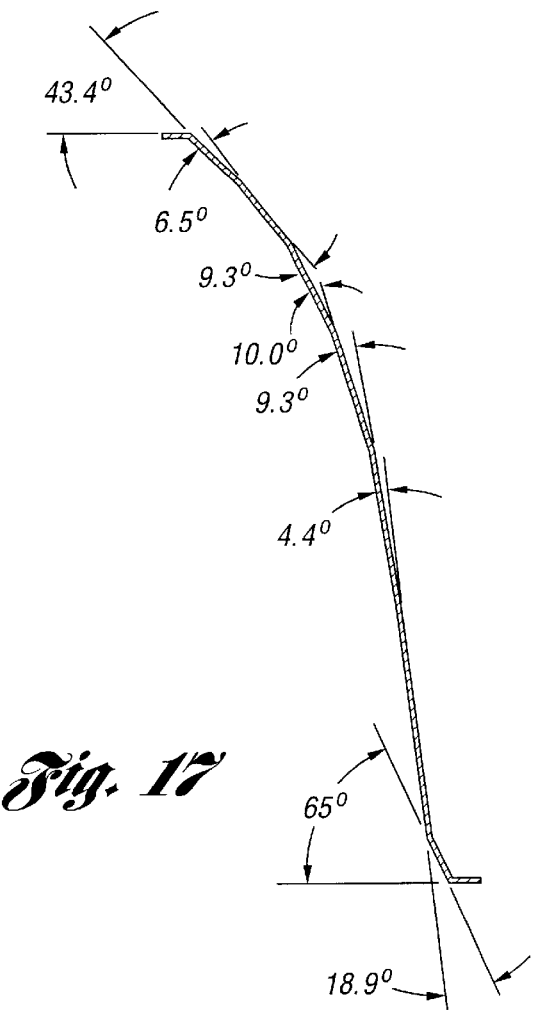
Fig. 16
Fig. 17

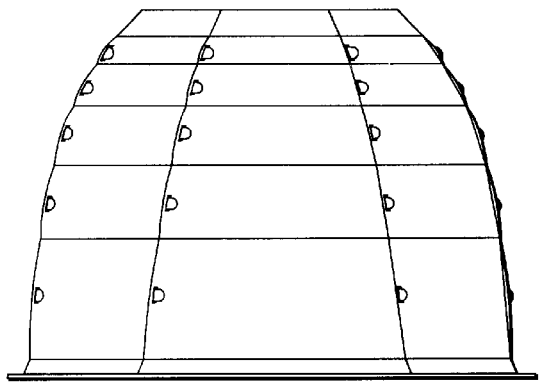
*Fig. 18*
*Fig. 19*
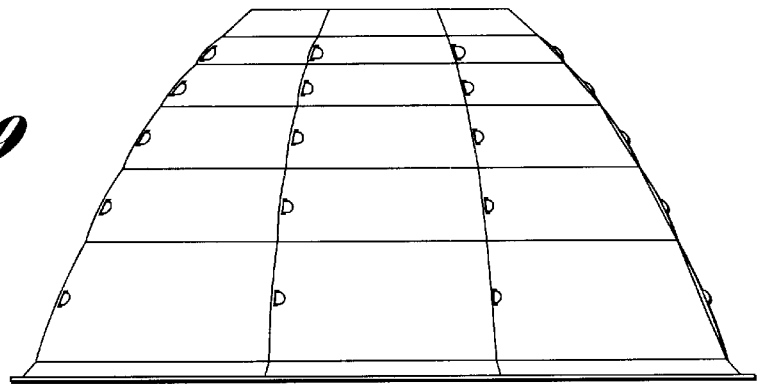
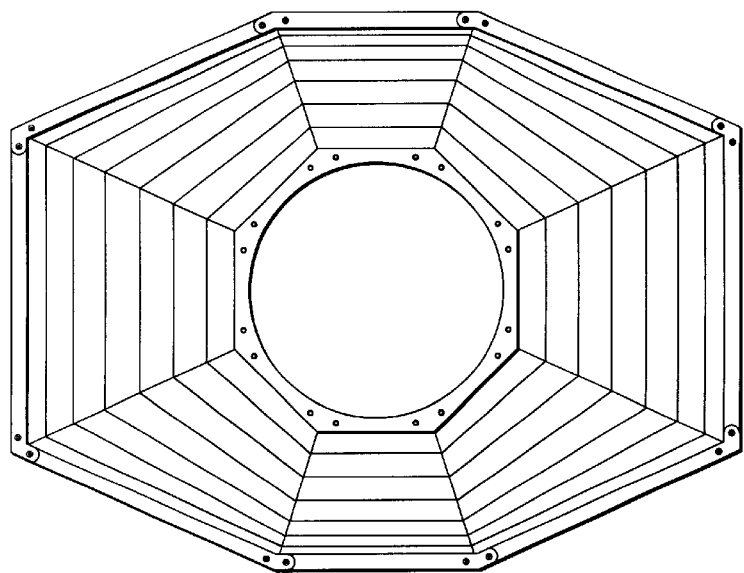
*Fig. 20*

FACETED REFLECTOR ASSEMBLY

TECHNICAL FIELD

This invention relates to reflectors for luminaire assemblies which are particularly suited for indoor lighting and certain architectural area and roadway lighting applications.

BACKGROUND ART

Suspended luminaire assemblies typically include, among other components, an optical assembly, an electrical assembly having a housing generally formed of metal for storing electrical components therein, a lamp, and a hanger member for suspending the assembly from its intended overhead location. Indoor suspended high-intensity discharge (HID) luminaires with open optics and high wattage lamps such as, for example, 400 W MH have traditionally used two kinds of optical units to direct light from the lamp onto the intended task: (1) transparent optical assemblies; and (2) opaque optical assemblies.

A typical transparent optical assembly is shown, for example, in FIG. 1 and designated generally by reference numeral 10. Assembly 10 consists of either glass or plastic 12, such that the distribution of light is ensured by a reflector, a refractor, or a combination of the two which can be achieved by known techniques such as, for example, prismatic structures.

As those skilled in the art will recognize, the desirable features offered by transparent optical assemblies such as that shown in FIG. 1 are high efficiency (generally greater than 90°), good light distribution, and the availability of a large uplight component. The uplight component for a glass reflector can be as high as 25% or greater of the total light emitted by the lamp. This typically includes approximately 10% coming from the top opening 14 of the reflector and approximately 15% coming through the glass 12. The fact that the glass reflector "glows" produces a source of brightness that reduces contrast and is considered an optimal feature for many lighting tasks.

A typical opaque optical assembly is shown in FIG. 2 of the drawings and is designated generally by reference numeral 16. Assembly 16 consists typically of a spun or hydro-formed metallic dome 18 having an interior which has been polished and anodized or painted with a high reflectivity white finish. The desirable feature offered by opaque optical assemblies such as the assembly 16 of FIG. 2 is the cut-off produced by the dark reflector. This cut-off is specifically desirable for applications where brightness through the reflector 18 may interfere with the lighting task.

Cut-off in an opaque optical assembly is achieved at the expense of efficiency since the post-anodizing process yields a typical reflectivity of 85%. This results in luminaire efficiencies of no greater than 80%. Because the only uplight available through such as reflector 18 is from its top opening 20, the typical uplight component for metallic reflectors is generally on the order of 10%. Opaque assemblies and in particular metallic reflectors can, of course, be punched with perforations to vary the desired uplight. As those skilled in the art will recognize, metallic reflectors exist that have slots punched into them. Because of the metallic structure, however, the punching process must be performed prior to forming or it may tear during the spinning or hydro-forming process. Cost constraints also limit the amount of punching which can be performed subsequent to forming. Accordingly, the slots found in prior art opaque optical assemblies are generally few and large due to the constraints indicated above of the manufacturing processes. Such slots provide few large patches of uplight that are generally too bright and fail to produce ceiling uniformity.

Consequently, a need exists for a reflector which can produce efficiencies typical of glass reflectors yet having the cut-off typical of metallic reflectors. Such a reflector should also accommodate perforations as a means of varying the upright component as well as the overall appearance of the optical assembly.

In addition, certain high performance lighting such as architectural areas and roadway lighting utilize glass reflectors systems. A need exists for an architectural or roadway application reflector which can produce efficiencies typical of glass reflectors yet having the advantages of metallic reflectors. Such a reflector would provide uniform illumination with a high average as well a both a low maximum to minimum ratio and a low average to minimum ratio while still providing an aesthetically pleasing outer appearance.

DISCLOSURE OF THE INVENTION

It is a principal object of the present invention to provide an improved reflector having the efficiencies typical of glass reflectors with the cut-off typical of metallic reflectors.

It is a further object of the present invention to provide an improved reflector having a means to provide a varying amount of uplight without sacrificing cut-off.

It is still another object of the present invention to provide an improved reflector having a means for varying uplight typical of that provided by glass and plastic reflectors.

It is yet another object of the present invention to provide an improved reflector which can produce a radial distribution similar to that of typical HID reflectors.

Yet still further, it is an object of the present invention to provide an improved reflector which offers the ability to change its symmetry so as to efficiently produce biaxial distributions.

Still further, it is an object of the present invention to provide an improved reflector which can be manufactured with a low tooling investment for a large degree of design flexibility.

In carrying out these and other objects, features and advantages of the present invention, there is provided a faceted reflector for use in a suspended luminaire. The faceted reflector includes a plurality of reflector segments each having interlocking means for attachment to another segment. The plurality of segments when interlocked form the faceted reflector.

In a preferred embodiment, each of the reflector segments is comprised of pre-anodized and enhanced aluminum having a specular, semi-specular, or a diffuse finish. The segments have a substantially curved cross section in a vertical plane. When interlocked to form the faceted reflector, a dome-shaped optical unit is formed having a regular polygonal cross section in a horizontal plane. Still further, in the preferred embodiment, the interlocking means includes a plurality of tabs and slots for interlocking with respective slots and tabs of other segments.

In yet another embodiment, the faceted reflector includes a plurality of perforations in one or more of the reflector segments according to predetermined patterns so as to allow light to pass therethrough.

The above objects and other objects, features and advantages of the present invention are readily apparent from the following detailed description of the best mode for carrying out the invention when taken in connection with the accompanying drawings.

BRIEF DESCRIPTION OF DRAWINGS

FIG. 16 is a plan view of an additional alternative embodiment of a reflector segment;

FIG. 17 is a cross-sectional view of FIG. 16 through line 17—17;

FIG. 18 is a perspective view of an alternative embodiment of reflector assembly 22;

FIG. 19 is a perspective view of an alternative embodiment of reflector assembly 22;

FIG. 20 is a bottom view of the reflector assembly shown in FIG. 19;

BEST MODE FOR CARRYING OUT THE INVENTION

Figure 1:
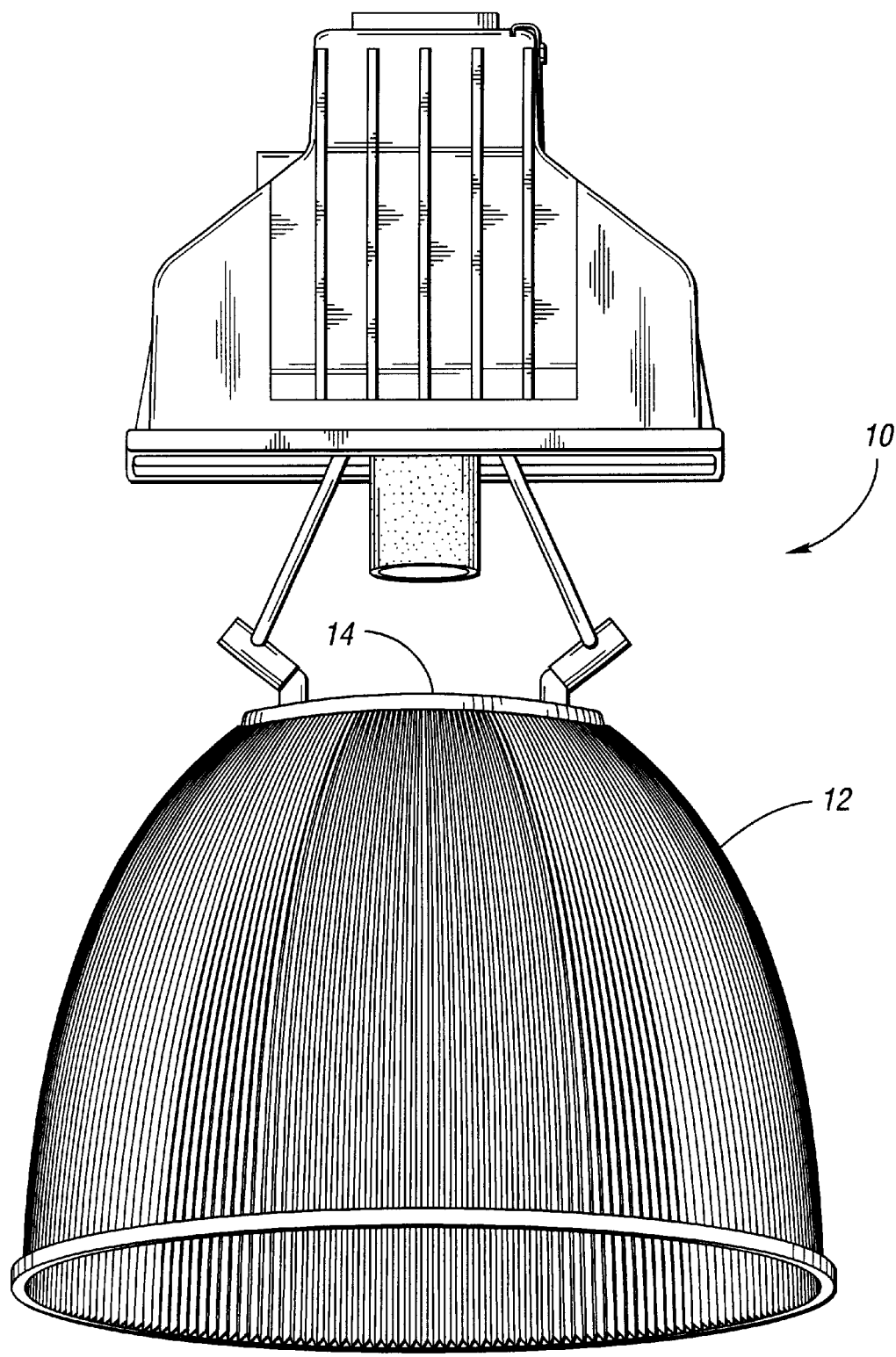
FIG 1 is a perspective view of a prior art transparent optical assembly.
Figure 2:
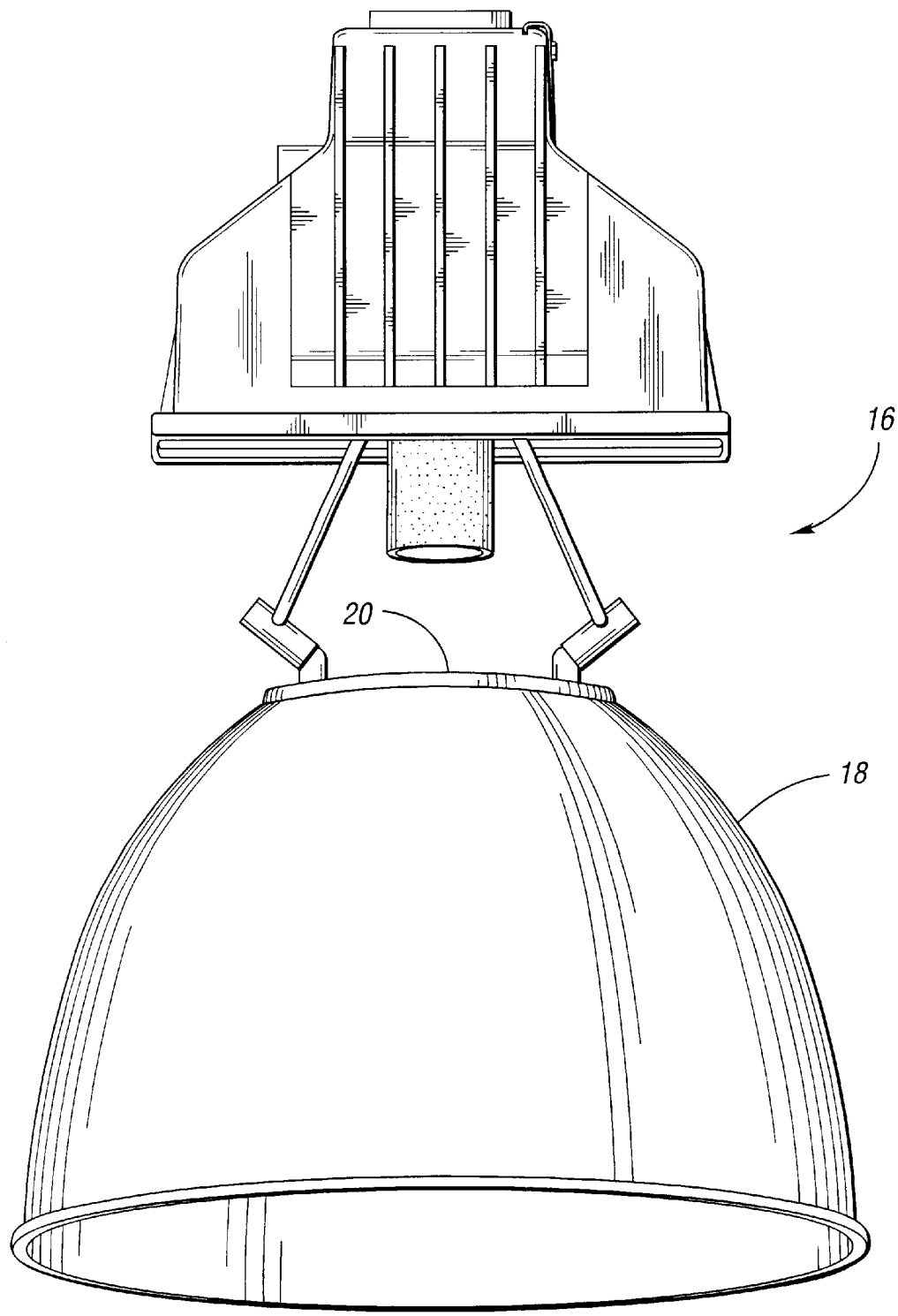
FIG. 2 is a perspective view of a prior art opaque optical assembly.
Figure 3:
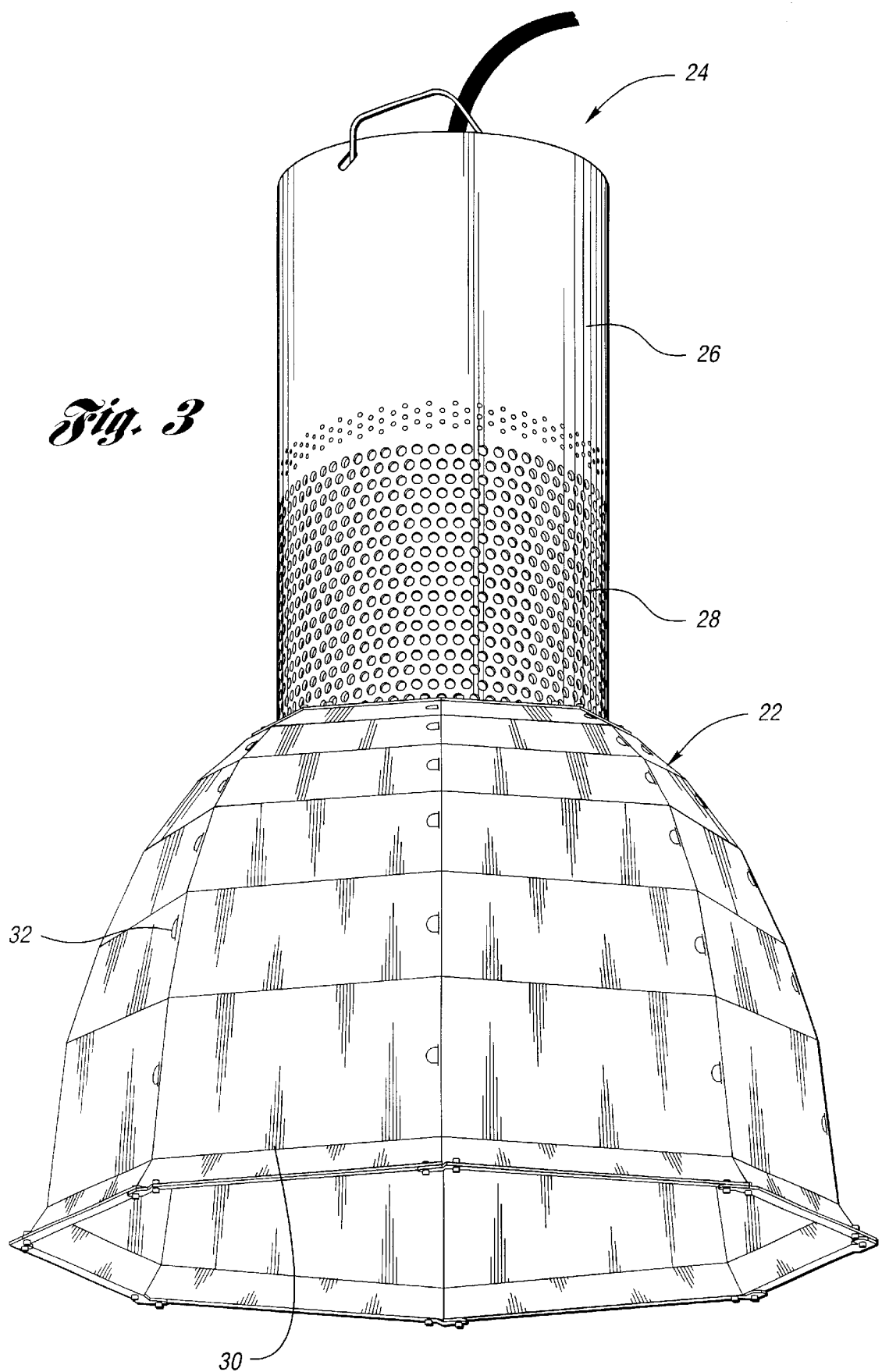
FIG. 3 perspective view of the faceted reflector assembly of the present invention shown as part of a luminaire assembly.
Figure 4:
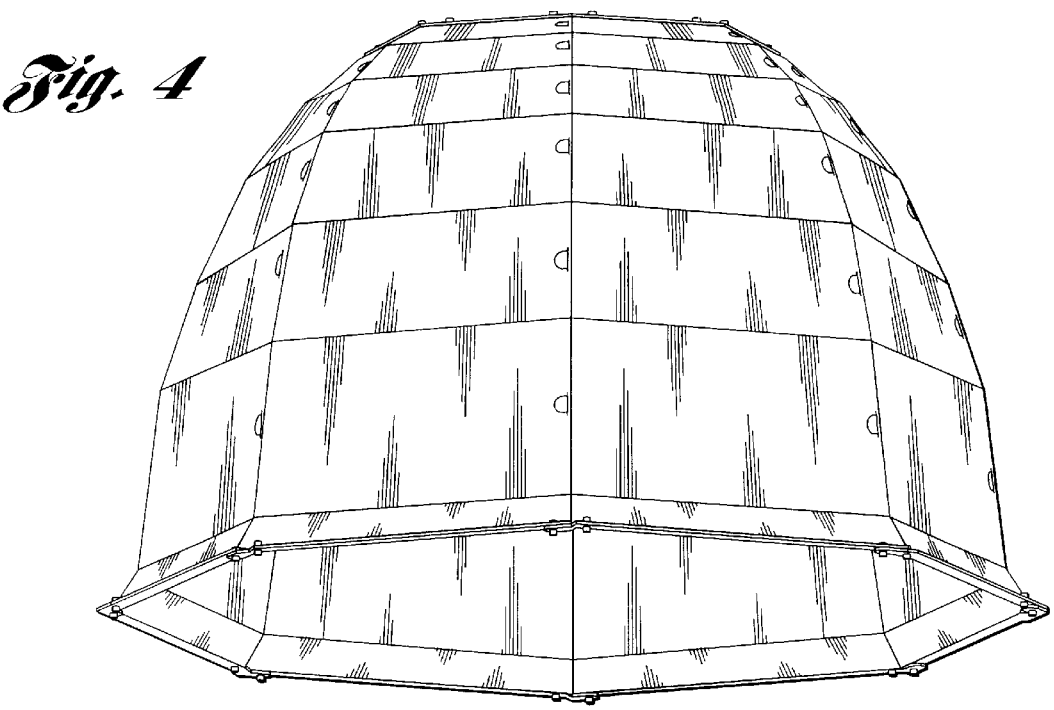
FIG. 4 is a perspective view of the faceted reflector assembly of the present invention.
Figure 5:
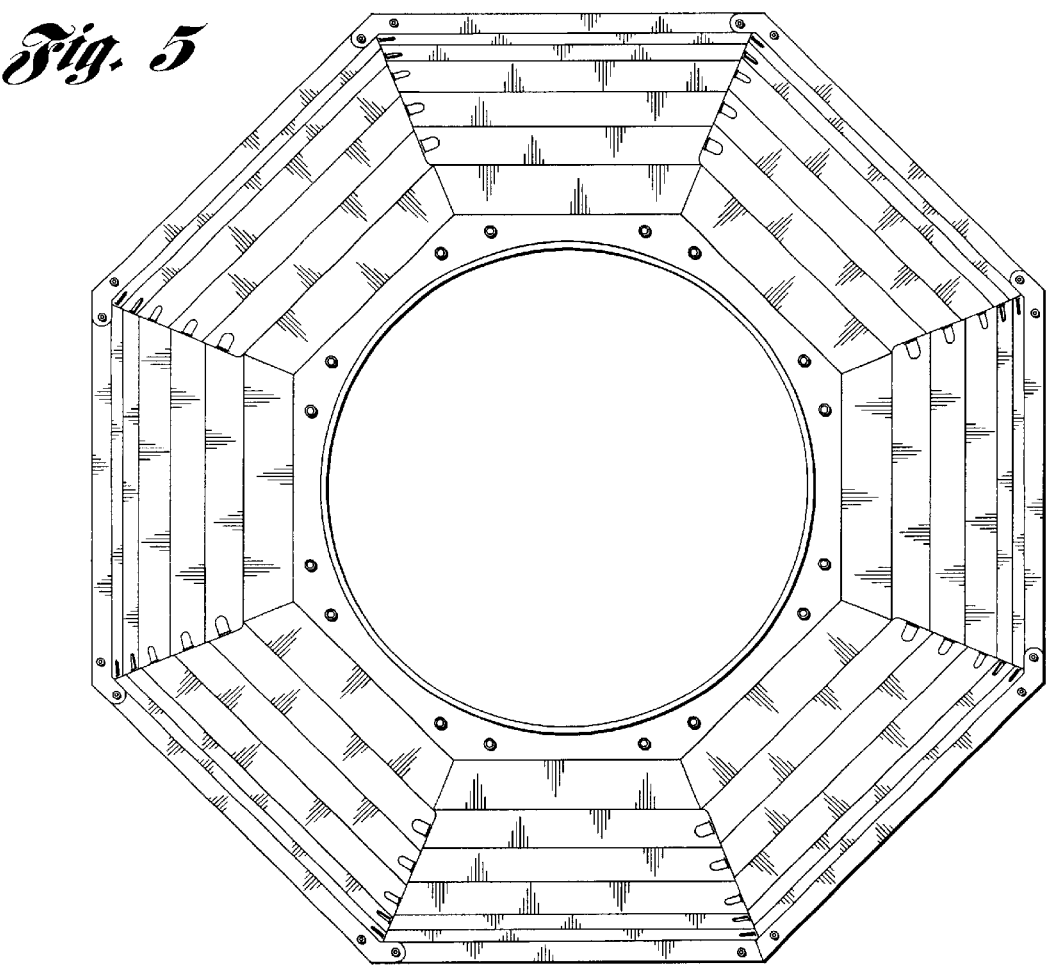
FIG. 5 bottom view of the reflector assembly of FIG. 4.
Figure 6:
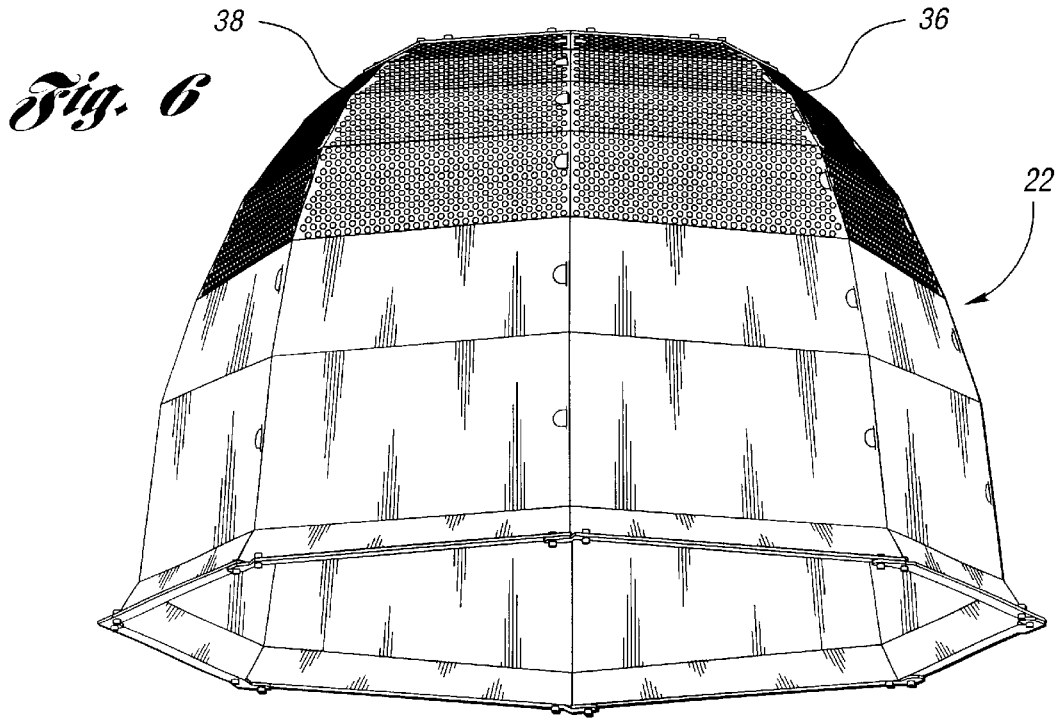
FIG. 6 is a perspective view of an alternative embodiment of the reflector assembly of the present invention shown having a plurality of perforations in its upper portion.
Figure 7:
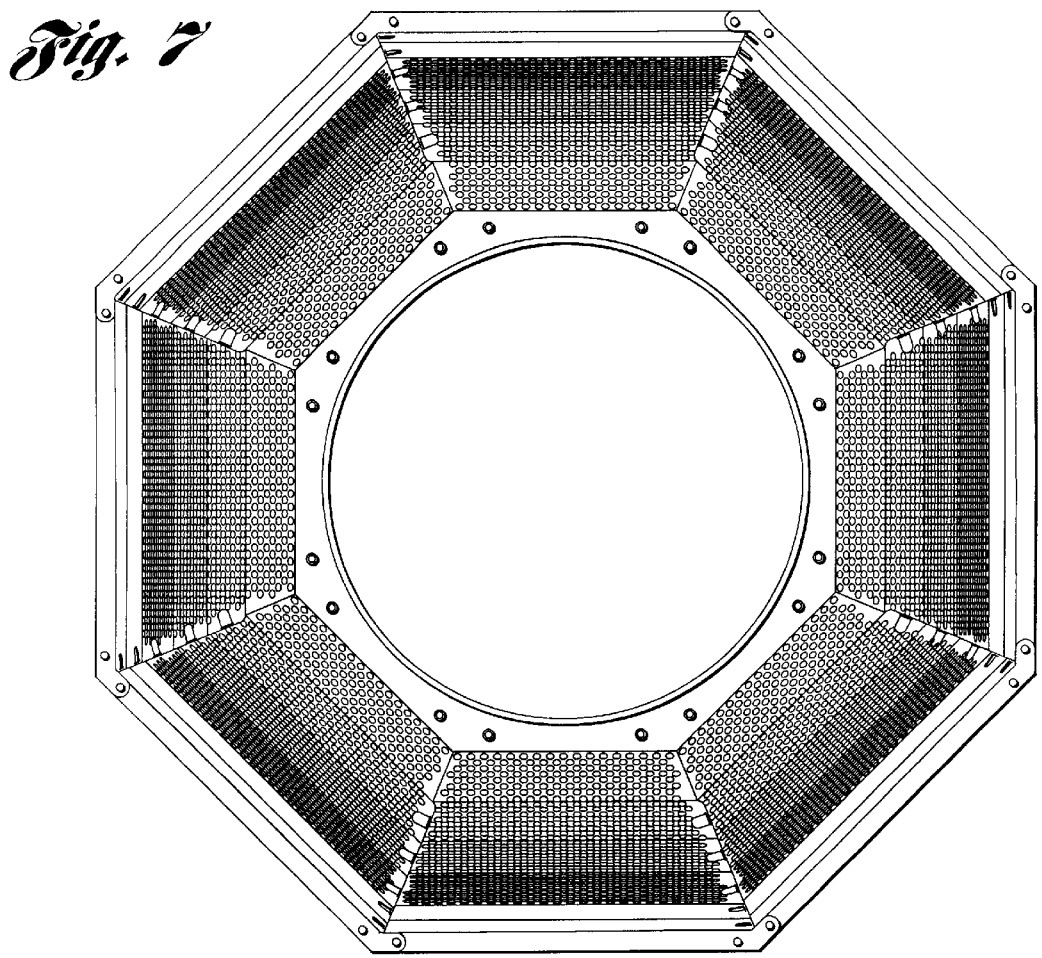
FIG. 7 is a bottom view of the reflector assembly of FIG. 6.

FIGS. 3–7 show the faceted reflector of the present invention in an assembled condition. As seen, reflector 22 is adapted to be fixed to an electrical assembly 24 having a housing 26 which is generally formed of metal for storing electrical components therein such as a ballast, a capacitor, a lamp, a starter, a relay, etc., all o which are known to those of ordinary skill in the art and thus not shown herein. Housing 26 is preferably made of sheet metal, but may, of course, be comprised of any suitable material having sufficient strength and thermal stability to dissipate heat generated by the internal electrical components. Housing 26 may also include one or more illumination perforations 28 for providing a patterned outlet of illumination from the lamp. Illuminating perforations 28 may form any pattern, design, or character string, the shape, spacing and location of which are limited only by the designer's imagination, as well as the size and stability of housing 26, and of course the intended task. Each individual perforation 28 may have a variety of shapes including, but not limited to, a square, a circle, or a triangle of any given orientation, a star, a cross or plus sign, a rectangle in any staggered or other type of orientation. Of course, it is further contemplated that each of these individual shapes may be used in any combination with any one or more of the individual shapes. As indicated above, illumination perforations 28 may also include a design or a character string.

Figure 8:
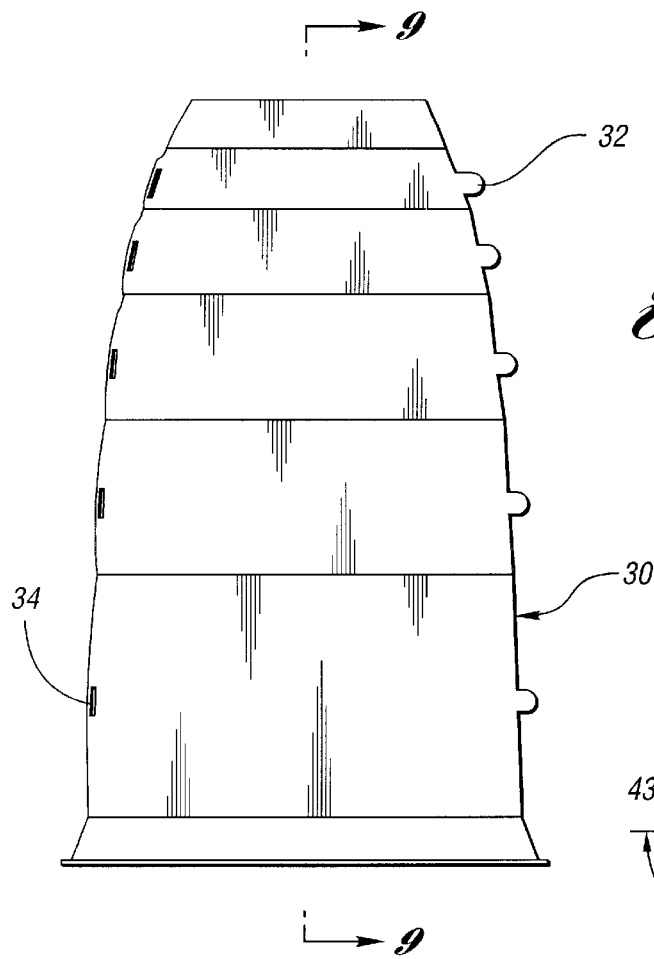
FIG. 8 is plan view of a bent reflector segment.
Figure 9:
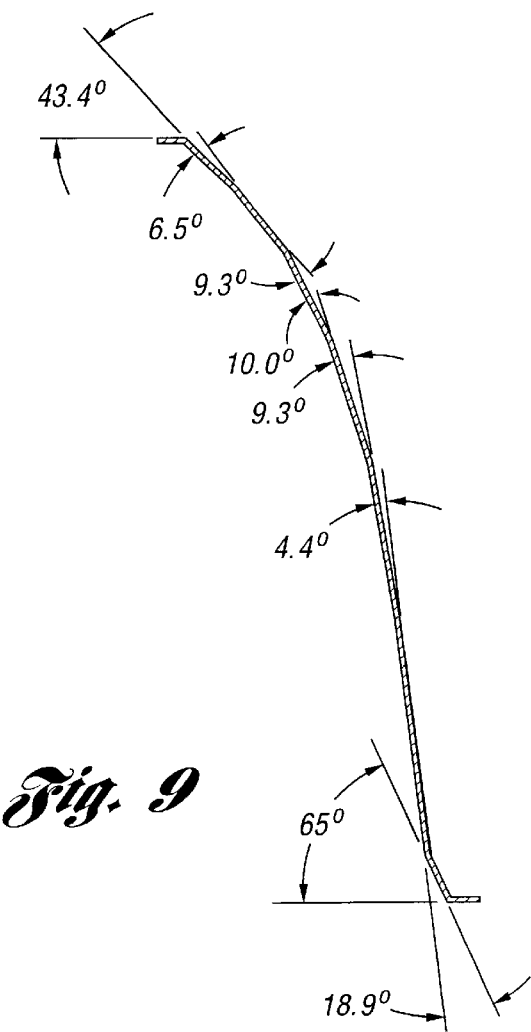
FIG. 9 is a cross-sectional view of FIG. 8 through line 9—9.
Figure 10:
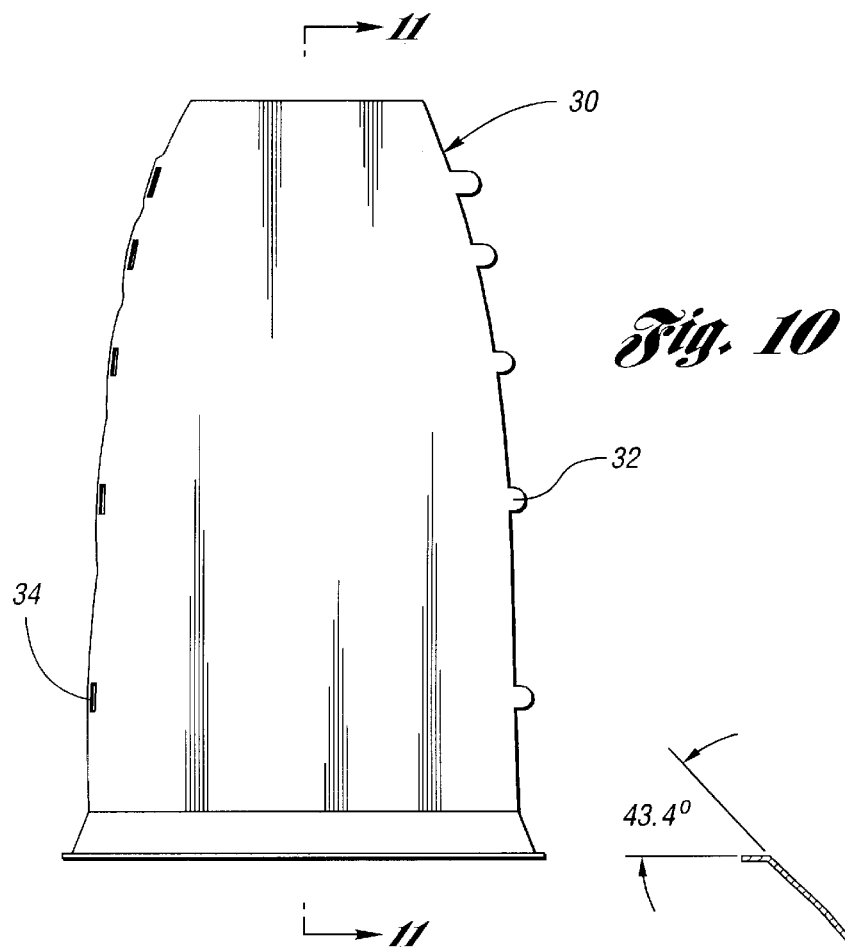
FIG. 10 is a plan view of an alternative embodiment of a reflector segment.
Figure 11:
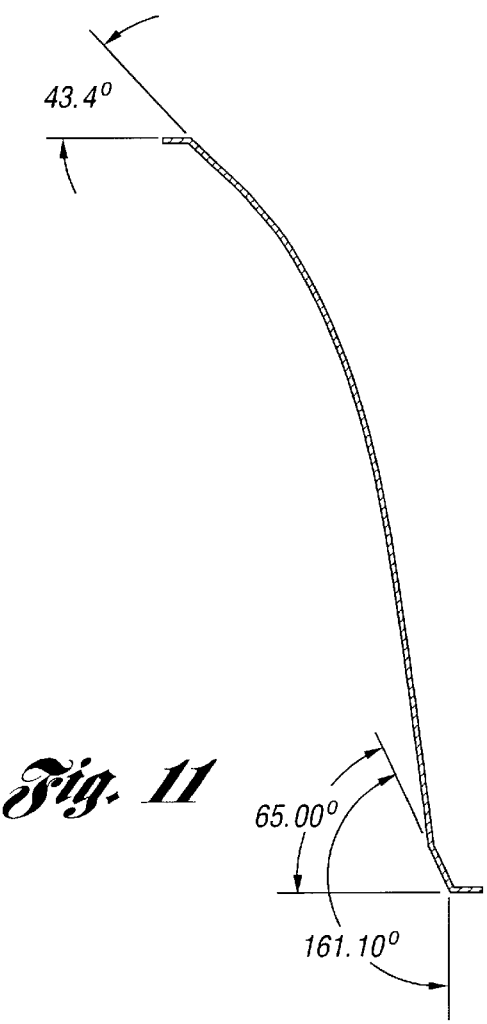
FIG. 11 a cross-sectional view of FIG. 10 through line 11—11.
Figure 12:
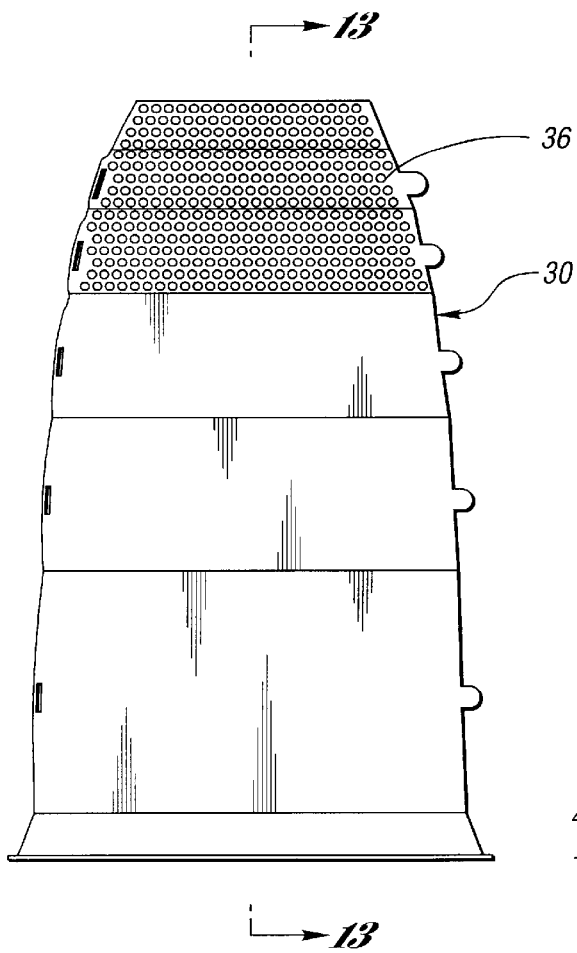
FIG. 12 is a plan view of an additional alternative embodiment of a reflector segment.
Figure 13:
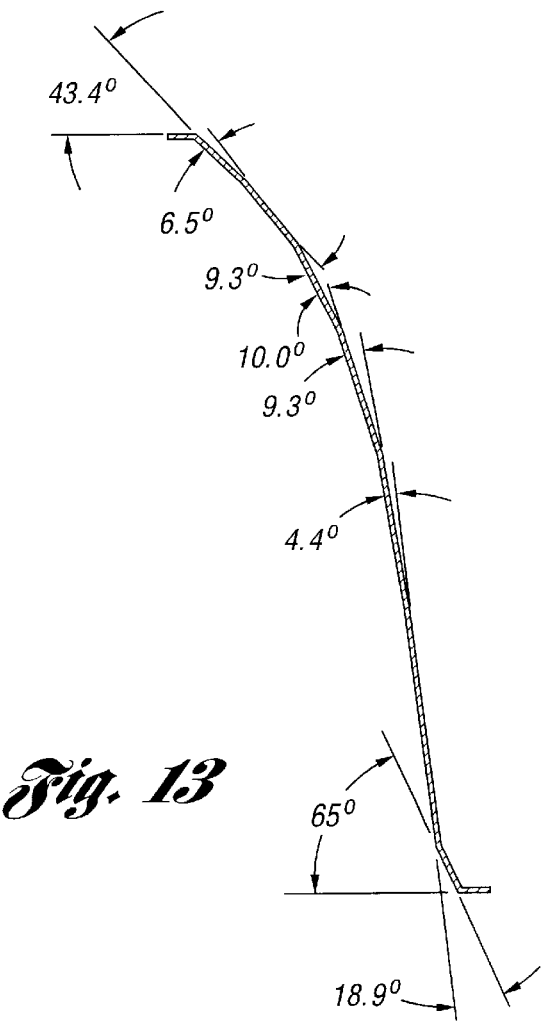
FIG. 13 is a cross-sectional view of FIG. 12 through line 13—13.
Figure 14:
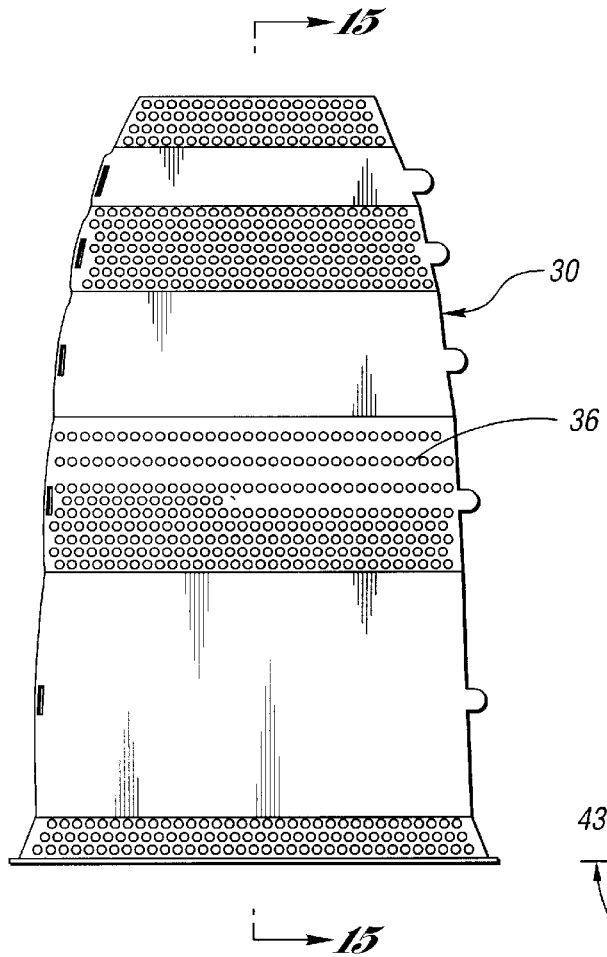
FIG. 14 is a plain view of an additional alternative embodiment of a reflector segment.
Figure 15:
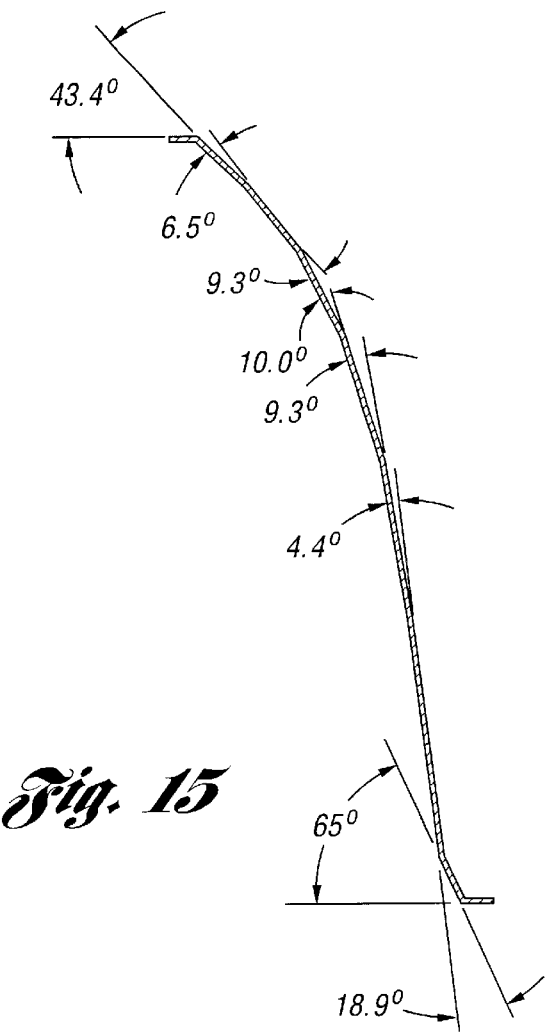
FIG. 15 is a cross-sectional view of FIG. 14 through line 15—15.

Reflector 22 which comprises the present invention is made up of a plurality of reflector segments or wedges 30 which are preferably, but not necessarily, made of high reflectivity pre-anodized and enhanced aluminum having a finish suitable for the intended task such as, for example, specular, semi-specular, or diffuse. In operation, reflector segments 30 are formed on a press brake or other suitable tooling known to those of skill in the art. Reflector segments 30, feature either bends as shown more clearly in FIGS. 8–9 or a smooth curved cross section in a vertical (radial) plane as shown more clearly in FIGS. 10–11. Reflector segments 30 are designed to interlock with one another using suitable interlocking means such as tabs 32 and slots 34 so as to create a faceted dome having a regular polygonal cross-section in a horizontal plane. This method of construction has been found necessary to allow the use of the pre-finished high reflectivity material. Conventional manufacturing processes for HID indoor metal reflectors such as spinning and hydro-forming have been found to draw the metal to such an extent that any pre-applied high reflectivity finish such as that used in the present invention is destroyed through the stretching of the metal.

Referring to FIGS. 6–7, 12–13, and 14–17, each or some of reflector segments 30 can similarly be perforated with a plurality of illumination perforations 36 for providing a predetermined outlet of illumination through the respective segment. Illumination perforations 36, like those in housing 26 may form any pattern, design, or character string which again is limited only by the imagination of the designer, the size and stability of the segment, and again, the intended task. Each individual perforation 36 may also have a variety of shapes including, but not limited to, a square, a circle, a triangle having any given orientation, a star, a cross, or plus sign, or a rectangular in any staggered or other type of orientation. Again, it is fully contemplated that each of these individual shapes may be used in any combination with any one or more of the other individual shapes. As mentioned, illumination perforations 36 may also include a design or a character string.

Illumination perforations 36 may also be placed at predetermined locations throughout the respective reflector segments 30 depending on the desired illumination effect. For example, when illumination perforations are located near the top 38 of reflector 22, the light passing through the reflector may be delivered as uptight in the 90–80% from vertical zone. Perforations 36 can be inexpensively applied before the reflector wedges are formed and assembled using CNC sheet metal punching equipment and individual or cluster tools.

Referring now to FIGS. 18–20 of the drawings, it is further understood that the horizontal cross section of the faceted reflector 22 formed of segments 30 can also be varied from a regular polygon to an irregular polygon thus providing a variety of biaxial and asymmetric distributions. The number of reflector segments 30 may also be varied to produce a horizontal cross section of a polygon with an increasing number of sides. For each specific distribution desired, an optimum number of reflector segments is required to produce uniformity in the resulting lighting layout. For example, a reflector design that uses four segments will produce a predominantly square distribution in the horizontal plane yet distorted by "spikes" caused by the 90° corners of the reflector.

The present invention optimizes the design from both a performance and a cost standpoint by using the minimum number of segments necessary to satisfy the application uniformity criteria. For example, it is presently believed that 8 segments will optimize many typical applications. In keeping with the invention, reflector segments 30 may also be made from high reflectivity (generally on the order of greater than 90%) metal painted white. In this manner, the reflector will provide all the uptight features discussed above but will be limited to an efficiency of approximately 80% similar to that of traditional metal reflectors resulting from the inability of white paint to precisely aim light out of the luminaire. The attractive feature of such a reflector, however, is its potentially low cost since thin gauge steel post-painted and in-house operation can be used for construction as opposed to traditional aluminum required by spinning and hydro-forming processes.

The invention as described and claimed herein, thus results in a faceted reflector which produces cut-off without sacrificing efficiency. More specifically, the use of highly reflective specular material efficiencies (greater than 90%) are possible with reflector sizes comparable to traditional ones. Accordingly, the faceted reflector 22 may produce efficiencies typical of glass reflectors yet with the cut-off typical of metallic reflectors. Still further, the invention produces a means of providing a varying amount of uptight without sacrificing cut-off. By selectively perforating the upper portions 38 of reflector segments 30, and by varying the amount of punching, greater or less uplight may be provided. Furthermore, the light exiting each of the respective reflector segments 30 through the perforations 36 can be practically contained to the 90–180° from vertical zone thus replicating the cut-off distribution offered by metallic reflectors.

Still further, the faceted reflector 22 described and claimed herein produces a means of varying uplight from zero (with a closed top reflector) to approximately 25% or more thus matching the amount of uplight offered by glass and/or plastic reflectors. As discussed above, illumination perforation 36 may have any shape, or position as well as density. A dense pattern of closely spaced perforations 36 may be applied to the top portion 38 of the reflector segments 30 thus producing a strong uplight component of 25% or more. Perforations 36 may also be applied to some but not all of the reflector segments resulting in luminaire brightness and uplight in one viewing direction and low luminaire brightness without uplight in a viewing different direction. Because of the modular (segmented) construction of the faceted reflector 22 herein, perforated and solid segments can also be alternated using a diversity of luminaire appearances and luminosity. For example, a reflector that has perforations on half of its reflector segments with remaining segments being solid may be constructed. The perforated side of the reflector may be faced to a retail store window or other desired attention area thus producing brightness and an "open look" while the solid side can be faced to the back of the store or non-viewing area increasing the light onto the merchandise.

The invention described and claimed herein produces a unique soft look of the reflector which is currently not available in the market. As is readily seen, the look of the perforated faceted reflector 22 may be softer than that of a transparent glass or plastic. Through strategic placement of the perforations 36, a strong uplight component may be delivered without excessive brightness. The entire reflector 22 can, of course, also be perforated with very small openings providing a very soft glowing appearance. Again, none of these unique appearances are presently available in the marketplace.

The radial symmetric distribution described above may be achieved when the horizontal cross section of the segmented reflector is a regular polygon. However, as indicated, by stretching the horizontal cross section in one or more directions, and by varying the vertical cross section of the reflector segments 30, it is anticipated that asymmetric and biaxial light distributions such as long and narrow can be created as shown, for example, in FIGS. 18–20. These light distributions can be created while at the same time maintaining all the other key benefits offered by the present invention such as efficiency, cut-off and uplight. These speciality distributions produce superior lighting in certain application layouts over radial symmetric reflectors. An example is the long and narrow distribution applied to the lighting of warehouse racks in narrow aisles.

Figure 21:
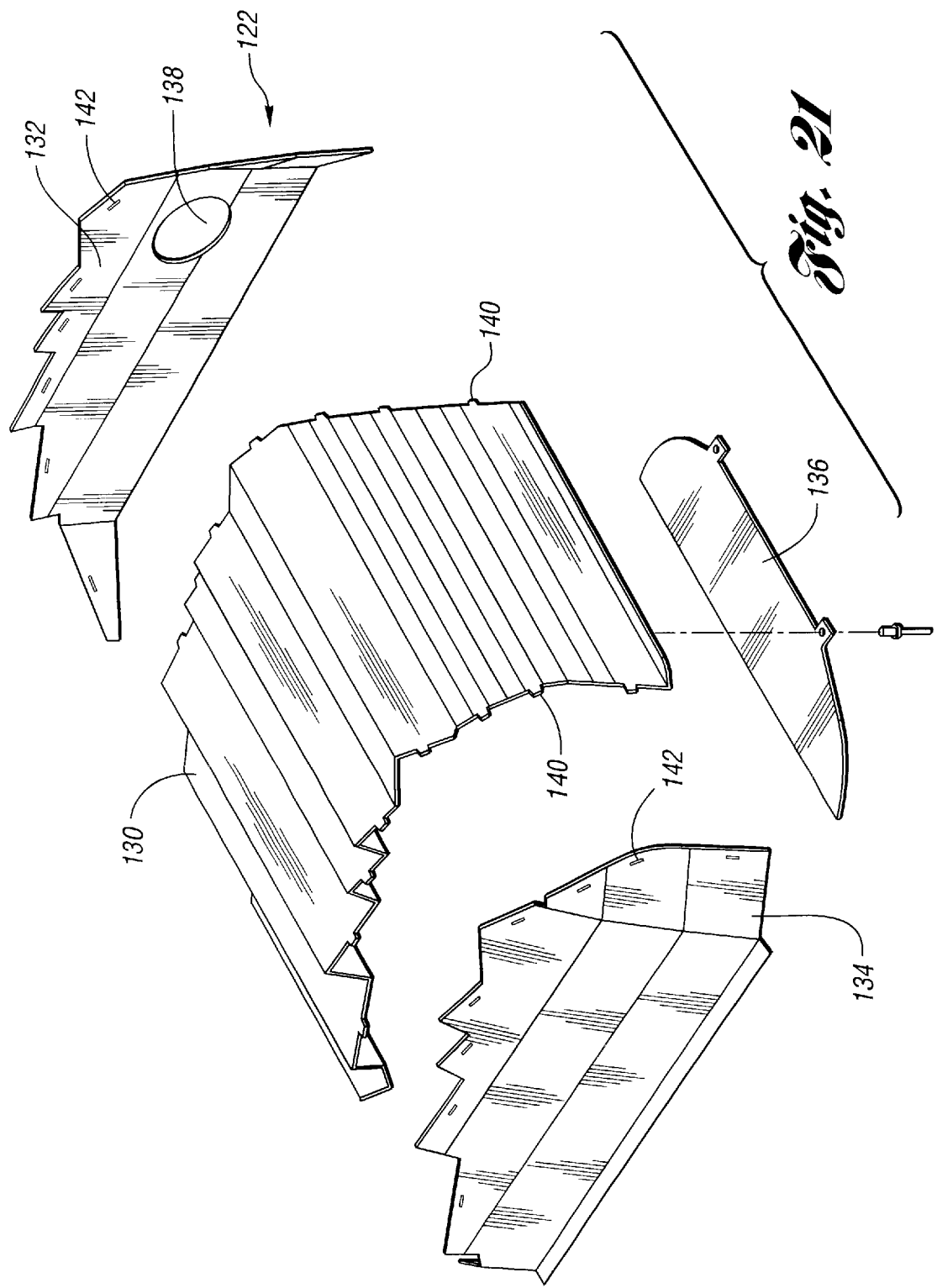
FIG. 21 is an exploded view of an alternative embodiment of the present invention.
Figure 22:
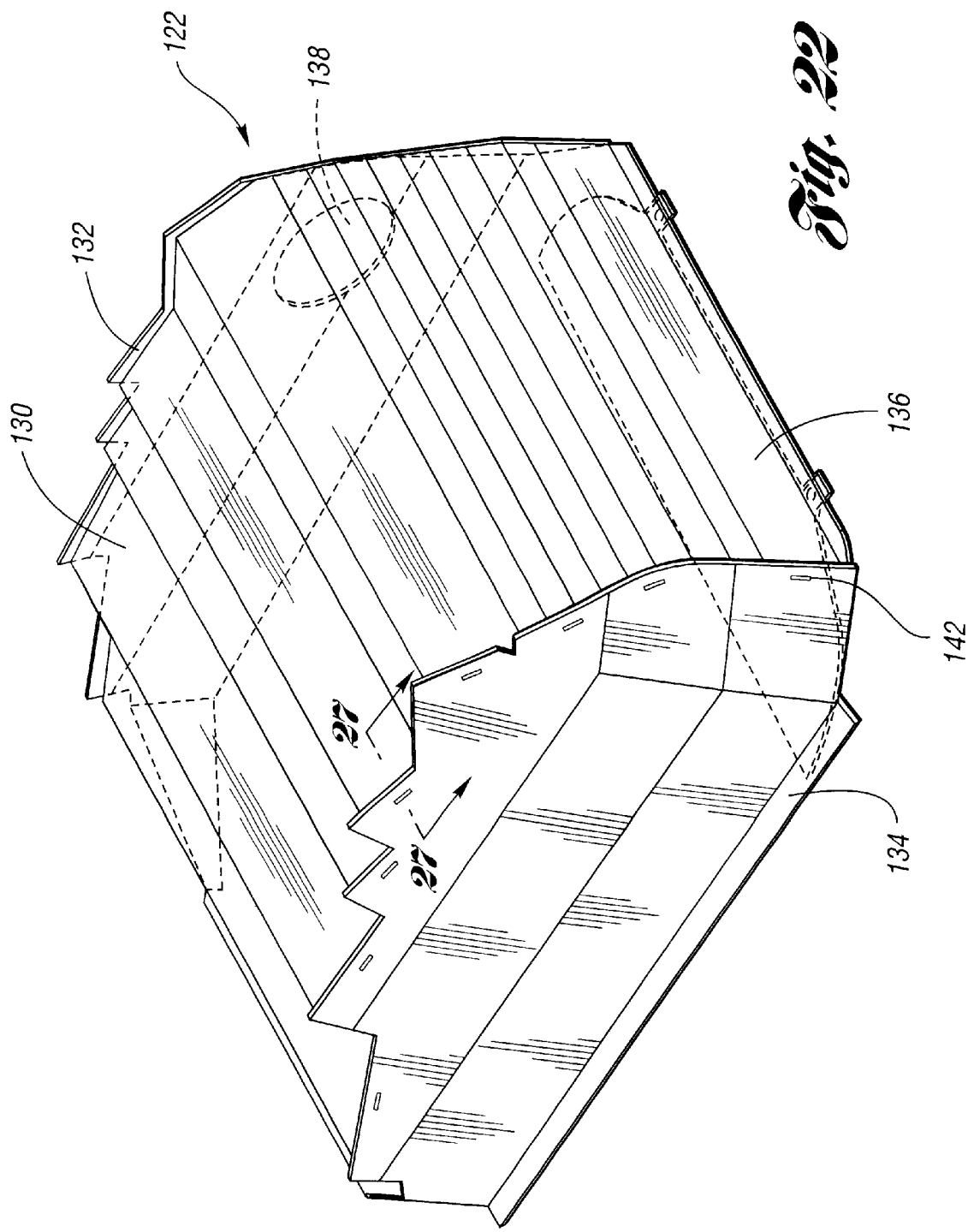
FIG. 22 is a perspective view of the alternative embodiment of FIG. 21.

Referring now to FIGS. 21 and 22, there is shown an alternative reflector 122 for use with a forward throw type luminaire having a horizontal lamp orientation. The reflector includes a top reflector segment 130, side reflector segments 132 and 134 and a bottom reflector segment 136. As is shown, side reflector segment includes a cavity 138. Cavity 138 is designed to accept various light means, lamps or lighting systems for use in creating the desired illumination.

Figure 27:
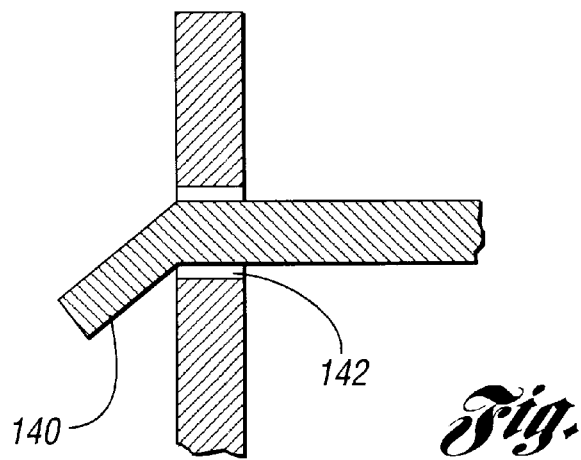
FIG. 27 is a cross section taken along lines 7—7 of FIG. 22, illustrating the tabs and slots of the present invention.

As discussed above, reflector 122 of the present invention is made of a plurality of side reflector segments or wedges 132, a top reflector segment 130 and a bottom reflector segment 136 which are preferably, but not necessarily, made of high reflectivity pre-anodized and enhanced aluminum having a finish suitable for the intended task such as, for example, specular, semi-specular, or diffuse. Top reflector segment 130 and side reflector segments 132 are designed to interlock with one another using suitable interlocking means such as tabs 140 and slots 142 so as to create the faceted reflector as shown in detail in FIG. 27.

The top reflector segment 130 is corrugated as shown in FIG. 21 and 22 and may also be made of a hammertone material having a high reflectance in a range from 70–95% and preferably in a range from 90–95%. Top reflector segment 130 may also be made of a diffuse material which is different than the materials that are used to make up the side reflective segments 132. Top reflector segment 130 may also have a combination structure where only a portion of the top reflector segment 130 is made of a diffuse material (not shown). Side reflector segments may also be made of any high efficient reflective material.

Figure 23:
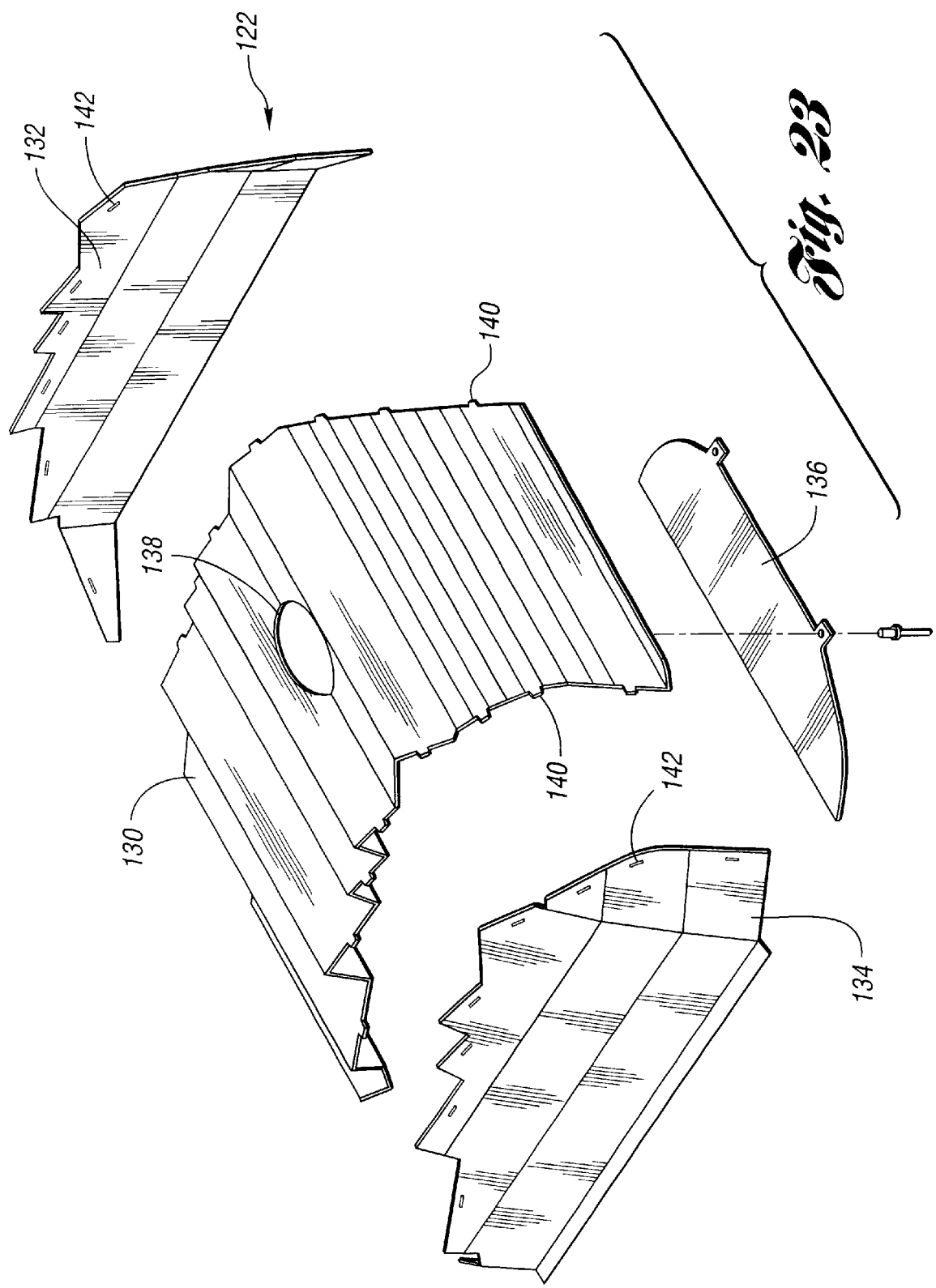
FIG. 23 is a an exploded view of another alternative embodiment of the present invention.
Figure 24:
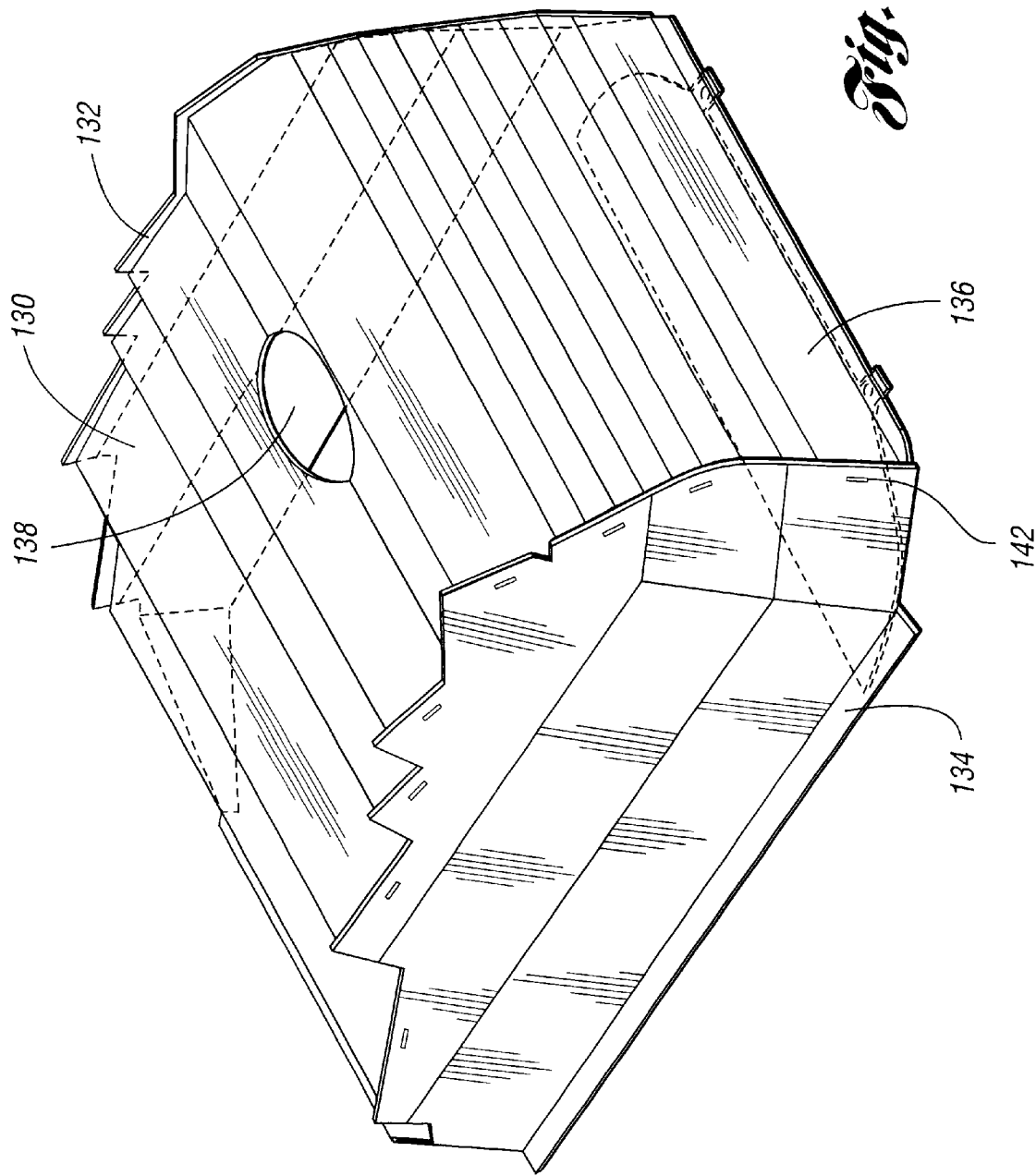
FIG. 24 is a perspective view of the alternative embodiment of FIG. 23.

Referring now to FIGS. 23 and 24, there is shown yet another alternative reflector 122 for use with a forward throw type luminaire having a vertical lamp orientation. The reflector includes a top reflector segment 130, side reflector segments 132 and 134 and a bottom reflector segment 136 as in the embodiment of FIGS. 21 and 22. As is shown, top reflector segment 130 includes a cavity 138. Cavity 138 is designed to accept various light means, lamps or lighting systems for use in creating the desired illumination as discussed above.

Figure 25:
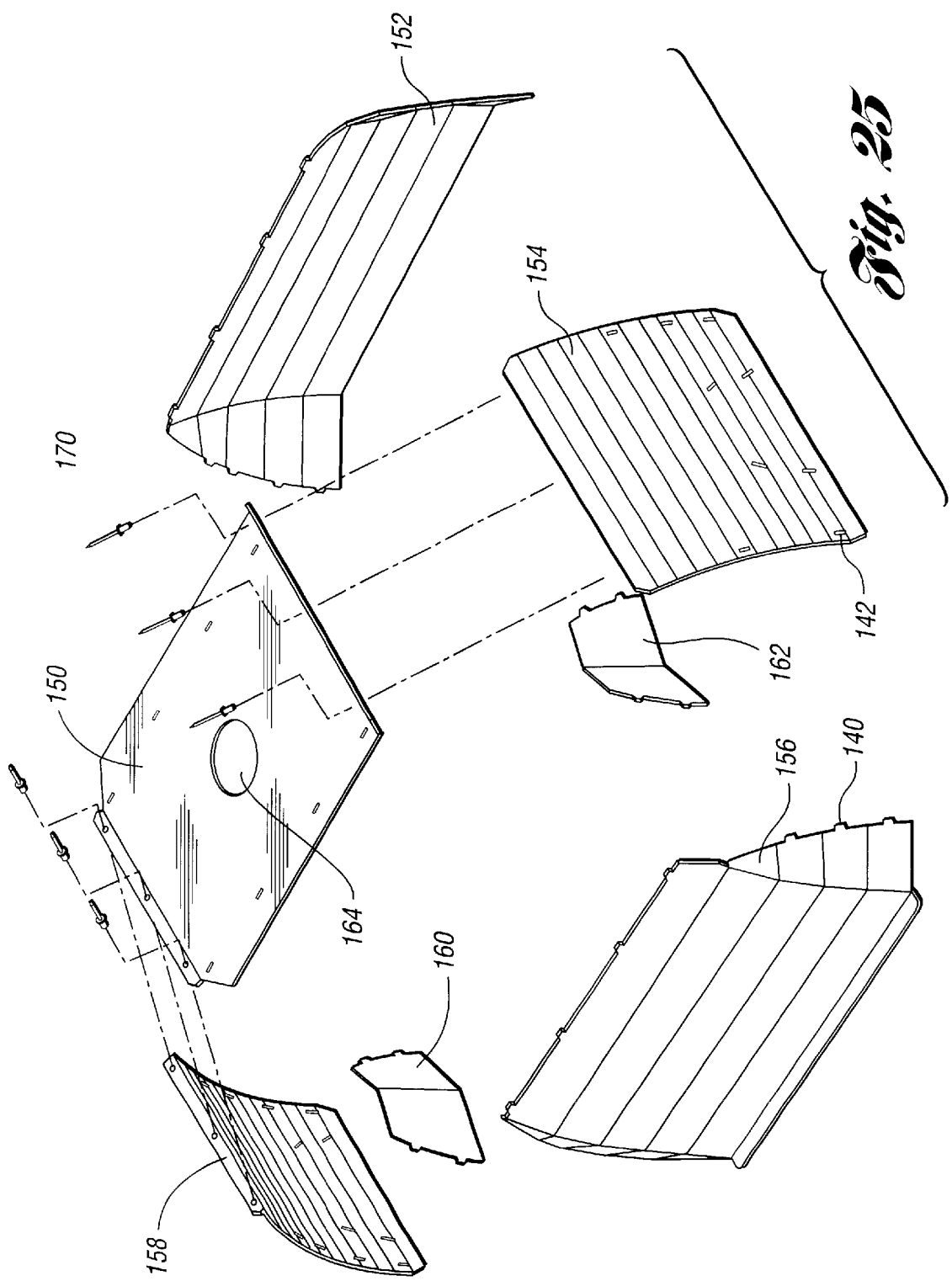
FIG. 25 is a an exploded view of still another alternative embodiment of the present invention.
Figure 26:
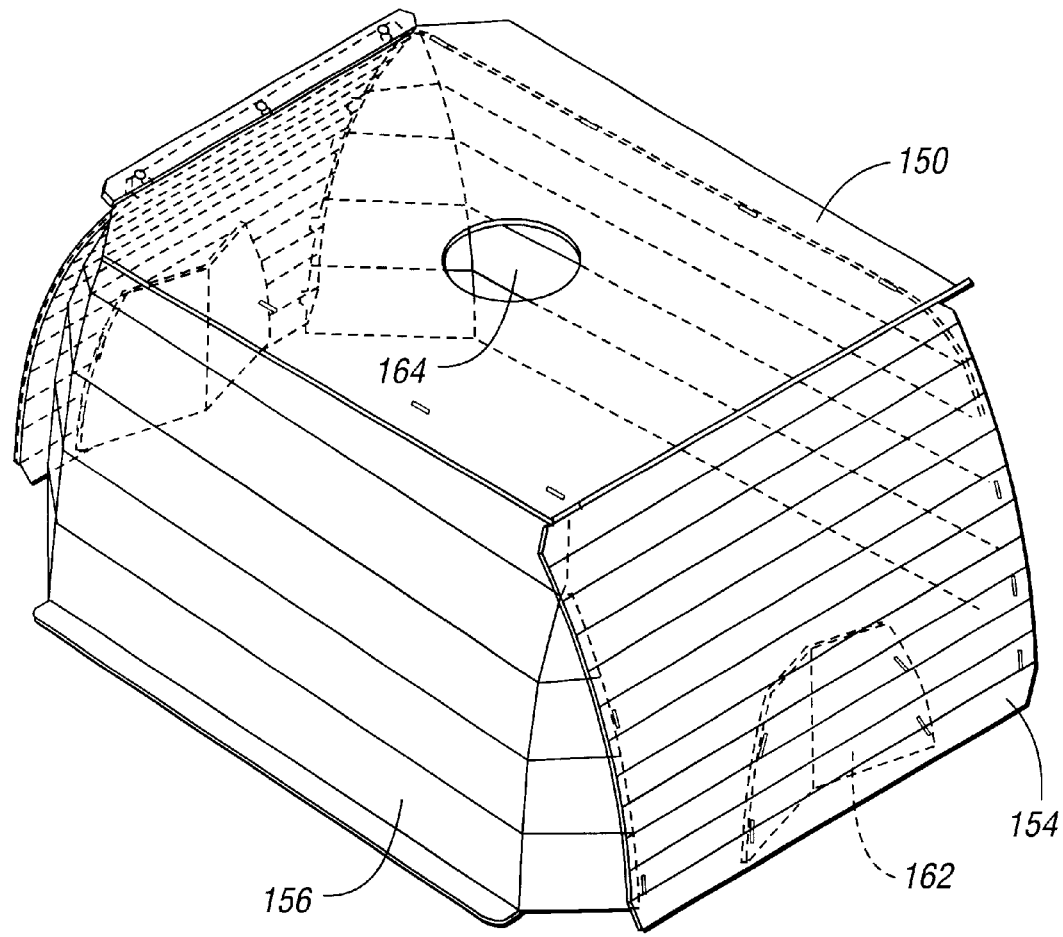
FIG. 26 is a perspective view of the alternative embodiment of FIG. 25.

Referring now to FIGS. 25 and 26, there is shown still another alternative reflector 122 for use with a luminaire having a vertical lamp orientation. The reflector includes a top reflector segment 150, side reflector segments 152, 154, 156 and 158 and internal segments 160 and 162. As is shown, top reflector segment includes a cavity 164. Cavity 164 is designed to accept various light means, lamps or lighting systems for use in creating the desired illumination. Top reflector segment 150 and side reflector segments 152, 154, 156 and 158 are designed to interlock with one another using suitable interlocking means such as tabs 140 and slots 142 as described above. Rivets 170 are also used to connect side reflector segments 154 and 158 to reflector segment 150. These reflectors produce lighting results which satisfy low average to minimum ratio as well as low maximum to minimum ratios. The luminaires using reflectors 122 can also be used for roadway lighting applications.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A faceted reflector for use in a luminaire, comprising:
   a plurality of top reflector segments, each of said top reflector segments being generally planar and horizontally oriented, said plurality of top reflector segments defining a cavity for insertion of a means for lighting; and
   a plurality of side reflector segments, each segment having interlocking means for attachment to another segment, and wherein said corresponding side reflector segments are attached to said top reflector segments;
   wherein the plurality of reflector segments form the faceted reflector.

2. A faceted reflector as in claim 1, wherein each of the reflector segments is comprised of pre-anodized and enhanced aluminum.

3. A faceted reflector as in claim 1, wherein each of the reflector segments has a specular finish.

4. A faceted reflector as in claim 1, wherein each of the reflector segments has a semi-specular finish.

5. A faceted reflector as in claim 1, wherein each of the reflector segments has a diffuse finish.

6. A faceted reflector as in claim 1, wherein at least one of the reflector segments has a specular finish.

7. A faceted reflector as in claim 1, wherein at least one of the reflector segments has a semi-specular finish.

8. A faceted reflector as in claim 1, wherein at least one of the reflector segments has a diffuse finish.

9. A faceted reflector as in claim 1, wherein said top reflector segments are corrugated.

10. A faceted reflector as in claim 1, wherein said top reflector segments are corrugated.

11. A faceted reflector as in claim 1, wherein the interlocking means comprises tabs and slots.

\* \* \* \* \*